United States Patent
Li et al.

(10) Patent No.: US 9,954,753 B2
(45) Date of Patent: Apr. 24, 2018

(54) NETWORK PERFORMANCE MONITORING METHOD AND APPARATUS

(71) Applicant: Huawei Technologies Co., Ltd., Shenzhen (CN)

(72) Inventors: Jie Li, Beijing (CN); Zhidong Yin, Beijing (CN); Mei Xu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 283 days.

(21) Appl. No.: 14/855,135

(22) Filed: Sep. 15, 2015

(65) Prior Publication Data

US 2016/0006634 A1 Jan. 7, 2016

Related U.S. Application Data

(63) Continuation of application No. PCT/CN2014/073431, filed on Mar. 14, 2014.

(30) Foreign Application Priority Data

Mar. 15, 2013 (CN) .......................... 2013 1 0084117

(51) Int. Cl.
H04L 12/26 (2006.01)
H04L 12/801 (2013.01)
H04L 29/06 (2006.01)

(52) U.S. Cl.
CPC ........ *H04L 43/0876* (2013.01); *H04L 43/022* (2013.01); *H04L 43/026* (2013.01);
(Continued)

(58) Field of Classification Search
None
See application file for complete search history.

(56) References Cited

U.S. PATENT DOCUMENTS 7,436,778 B1 * 10/2008 Iannaccone ......... H04L 43/0864
370/230
2003/0120802 A1 * 6/2003 Kohno .................... H04L 29/06
709/237
(Continued)

FOREIGN PATENT DOCUMENTS

CN 1585352 A 2/2005
CN 101355461 A 1/2009
(Continued)

OTHER PUBLICATIONS

Frost, D., et al., "A Packet Loss and Delay Measurement Profile for MPLS-Based Transport Networks," Internet Engineering Task Force (IETF), Request for Comments: 6375, ISSN: 2070-1721, Sep. 2011, 5 pages.
(Continued)

*Primary Examiner* — Chi H Pham
*Assistant Examiner* — Fahmida Chowdhury
(74) *Attorney, Agent, or Firm* — Slater Matsil, LLP

(57) ABSTRACT

Embodiments of the present application provide a network performance monitoring method and apparatus. The apparatus records a time (e.g. a first time) at which a first network device sends a first packet to a second network device, records a time (e.g. a second time) at which the first network device receives a response packet of the first packet, and determines a round-trip delay between the first and second network devices according to the first and second times; within a preset time, the apparatus collects statistics about a quantity (e.g. a first count) of first packets that are sent by the first network device to the second network device, and collects statistics about a quantity (e.g. a second count) of retransmitted packets in the first packets, and determines a packet loss rate from the first network device to the second network device according to the first and second counts.

10 Claims, 6 Drawing Sheets

(52) U.S. Cl.
CPC ...... *H04L 43/0829* (2013.01); *H04L 43/0864* (2013.01); *H04L 43/12* (2013.01); *H04L 47/115* (2013.01); *H04L 69/16* (2013.01)

(56) References Cited

U.S. PATENT DOCUMENTS

2003/0145077 A1    7/2003   Khan et al.
2009/0310500 A1*   12/2009   Matsuda ............. H04L 43/0864
                                                                         370/252
2013/0054778 A1    2/2013   Eskicioglu et al.

FOREIGN PATENT DOCUMENTS

| | | |
|---|---|---|
| CN | 102118278 A | 7/2011 |
| CN | 103152223 A | 6/2013 |
| EP | 2339784 A1 | 6/2011 |

OTHER PUBLICATIONS

Ong, L., et al., "An Introduction to the Stream Control Transmission Protocol (SCTP)," Network Working Group, Request for Comments: 3286, May 2002, 10 pages.
"Transmission Control Protocol; Darpa Internet Program; Protocol Specification," Request for Comments: 793, Sep. 1981, 90 pages.
"Series Y: Global Information Infrastructure, Internet Protocol Aspects and Next-Generation Networks; Internet protocol aspects—Operation, administration and maintenance; OAM functions and mechanisms for Ethernet based networks," ITU-T Telecommunication Standardization Sector of ITU, Y.1731, Feb. 2008, 81 pages.

\* cited by examiner

NETWORK PERFORMANCE MONITORING METHOD AND APPARATUS

This application is a continuation of International Application No. PCT/CN2014/073431, filed on Mar. 14, 2014, which claims priority to Chinese Patent Application No. 201310084117.8, filed on Mar. 15, 2013, both of which are hereby incorporated by reference in their entireties.

TECHNICAL FIELD

Embodiments of the present application relate to communications technologies, and in particular, to a network performance monitoring method and apparatus.

BACKGROUND

Traditional IP network performance monitoring uses a solution based on active measurement. The solution of active measurement is a test solution in an analog form, and a test packet is exchanged between node A and node B in a network to determine performance such as packet loss, a delay, and a jitter on a network path between node A and node B. Testing a delay is used as an example. Node A generates and sends a test packet to node B every a predetermined period, and node A records a sending time T1 of the test packet. After receiving the test packet, node B constructs a test packet that is to be used as a response packet, and sends the response packet to node A. After receiving the response packet, node A records a time T4 at which the response packet is received. A difference between T4 and T1 is calculated to obtain a round-trip delay between node A and node B. The solution of active measurement increases network load.

SUMMARY

Embodiments of the present application provide a network performance monitoring method and apparatus, which may reduce network load when network performance is measured.

According to a first aspect, an embodiment of the present application provides a network performance monitoring method that includes receiving, by a network performance monitoring apparatus, a second packet sent by a first network device, where the second packet is a duplicate packet of a first packet, the second packet is copied when the first network device sends the first packet to a second network device, a destination receive end of the first packet is the second network device, a type of the first packet is a packet of a traffic flow transmitted by using a connection-oriented protocol or a packet that is used to establish a connection, and the connection is used to transmit a traffic flow by using a connection-oriented protocol; recording, by the network performance monitoring apparatus, a first time, where the first time is a time at which the network performance monitoring apparatus receives the second packet; receiving, by the network performance monitoring apparatus, a fourth packet sent by the first network device, where the fourth packet is a duplicate packet of a third packet, the fourth packet is copied when the first network device receives the third packet sent by the second network device, a type of the third packet is the same as the type of the first packet, and a source transmit end of the third packet is the second network device when the network performance monitoring apparatus determines that the fourth packet is a response packet of the second packet, recording, by the network performance monitoring apparatus, a second time, where the second time is a time at which the network performance monitoring apparatus receives the fourth packet; and determining, by the network performance monitoring apparatus, a round-trip delay between the first network device and the second network device according to the first time and the second time.

The second packet is a duplicate packet of the first packet, the second packet is copied when the first network device sends the first packet to the second network device, a destination receive end of the first packet is the second network device, a type of the first packet includes a packet of a traffic flow transmitted by using a connection-oriented protocol and a packet that is used to establish a connection, and the connection is used to transmit a traffic flow by using a connection-oriented protocol; recording, by the network performance monitoring apparatus, a first time, where the first time is a time at which the network performance monitoring apparatus receives the second packet; receiving, by the network performance monitoring apparatus, a fourth packet sent by the first network device, where the fourth packet is a duplicate packet of the third packet, the fourth packet is copied when the first network device receives the third packet sent by the second network device, and a type of the third packet is the same as the type of the first packet, when the network performance monitoring apparatus determines that the fourth packet is a response packet of the second packet, recording, by the network performance monitoring apparatus, a second time, where the second time is a time at which the network performance monitoring apparatus receives the fourth packet; and determining, by the network performance monitoring apparatus, a round-trip delay between the first network device and the second network device according to the first time and the second time.

In a first possible implementation manner of the first aspect, if the network performance monitoring apparatus is disposed outside the first network device, the receiving, by the network performance monitoring apparatus, the second packet sent by the first network device includes receiving, by the network performance monitoring apparatus, the second packet obtained by the first network device by copying the first packet in a mirroring manner; and the receiving, by the network performance monitoring apparatus, the fourth packet sent by the first network device includes receiving, by the network performance monitoring apparatus, the fourth packet obtained by the first network device by copying the third packet in the mirroring manner.

In a second possible implementation manner of the first aspect, the first network device is an optical splitter.

With reference to the first aspect, or the first possible implementation manner of the first aspect, or the second possible implementation manner of the first aspect, in a third possible implementation manner of the first aspect, the connection-oriented protocol includes the Transmission Control Protocol (Transmission Control Protocol, TCP) or the Stream Control Transmission Protocol (Stream Control Transmission Protocol, SCTP).

According to a second aspect, an embodiment of the present application provides a network performance monitoring apparatus that includes a receiving module, configured to receive a second packet sent by a first network device, where the second packet is a duplicate packet of a first packet, the second packet is copied when the first network device sends the first packet to a second network device, a destination receive end of the first packet is the second network device, a type of the first packet is a packet of a traffic flow transmitted by using a connection-oriented protocol or a packet that is used to establish a connection, and the connection is used to transmit a traffic flow by using a connection-oriented protocol; a recording module, configured to record a first time, where the first time is a time at which the receiving module receives the second packet, where the receiving module is further configured to receive a fourth packet sent by the first network device, where the fourth packet is a duplicate packet of a third packet, the fourth packet is copied when the first network device receives the third packet sent by the second network device, a type of the third packet is the same as the type of the first packet, and a source transmit end of the third packet is the second network device; and a determining module, configured to determine whether the fourth packet is a response packet of the second packet, where the recording module is further configured to record a second time when the determining module determines that the fourth packet is the response packet of the second packet, where the second time is a time at which the receiving module receives the fourth packet; and the determining module is further configured to determine a round-trip delay between the first network device and the second network device according to the first time and the second time that are recorded by the recording module.

In a first possible implementation manner of the second aspect, the network performance monitoring apparatus is disposed outside the first network device; the receiving module is specifically configured to receive the second packet obtained by the first network device by copying the first packet in a mirroring manner; and the receiving module is further specifically configured to receive the fourth packet obtained by the first network device by copying the third packet in the mirroring manner.

In a second possible implementation manner of the second aspect, the first network device is an optical splitter.

With reference to the second aspect, or the first possible implementation manner of the second aspect, or the second possible implementation manner of the second aspect, in a third possible implementation manner of the second aspect, the connection-oriented protocol includes TCP or SCTP.

In the foregoing technical solutions, a network performance monitoring apparatus disposed inside or outside a first network device records a first time when receiving a second packet sent by the first network device, records a second time when determining that a response packet of the second packet sent by the first network device is received, and determines a round-trip delay between the first network device and a second network device according to the first time and the second time. The second packet is copied when the first network device sends a first packet to the second network device, a type of the first packet is a packet of a traffic flow transmitted by using a connection-oriented protocol or a packet that is used to establish a connection, where the connection is used to transmit a traffic flow by using a connection-oriented protocol, and a destination receive end of the first packet is the second network device. The first packet and a third packet are packets of traffic flows that actually exist in a network or packets that are used to establish a connection, instead of packets of test flows that are extra added to the network. Therefore, when network performance is measured, the solutions provided in the embodiments may reduce network load.

According to a third aspect, an embodiment of the present application provides a network performance monitoring method that includes receiving, by a network performance monitoring apparatus within a preset time, a second packet sent by a first network device, where the second packet is a duplicate packet of a first packet, the second packet is copied when the first network device sends the first packet to a second network device, a destination receive end of the first packet is the second network device, and a type of the first packet is a packet of a traffic flow transmitted by using a connection-oriented protocol; collecting, by the network performance monitoring apparatus, statistics about a quantity of the second packets received within the preset time to obtain a first count; collecting, by the network performance monitoring apparatus, statistics about a quantity of retransmitted packets in the second packets received within the preset time to obtain a second count; and determining, by the network performance monitoring apparatus, a packet loss rate from the first network device to the second network device according to the first count and the second count.

In a first possible implementation manner of the third aspect, the collecting, by the network performance monitoring apparatus, statistics about a quantity of the second packets received within the preset time to obtain a first count, and the collecting, by the network performance monitoring apparatus, statistics about a quantity of retransmitted packets in the second packets received within the preset time to obtain a second count include: setting, by the network performance monitoring apparatus, a first counter and a second counter, where a value of the first counter is the first count, a value of the second counter is the second count, and initial values of the first counter and the second counter are respectively set to zero; when the network performance monitoring apparatus receives the second packet, increasing the value of the first counter by 1, and searching, according to a sequence number and a traffic flow identifier that are carried by the second packet, information stored by the network performance monitoring apparatus to determine whether a matching item exists, where the stored information includes a correspondence between a sequence number and a traffic flow identifier; if the matching item exists, determining, by the network performance monitoring apparatus, that the second packet is the retransmitted packet, and increasing the value of the second counter by 1; and if the matching item does not exist, saving, by the network performance monitoring apparatus, a correspondence between the sequence number and the traffic flow identifier that are carried by the second packet.

With reference to the third aspect or the first possible implementation manner of third aspect, in a second possible implementation manner of the third aspect, if the network performance monitoring apparatus is disposed outside the first network device, the receiving, by the network performance monitoring apparatus, the second packet sent by the first network device includes receiving, by the network performance monitoring apparatus, the second packet obtained by the first network device by copying the first packet in a mirroring manner.

With reference to the third aspect or the first possible implementation manner of the third aspect, in a third possible implementation manner of the third aspect, the first network device is an optical splitter.

With reference to the third aspect or any one of the first to the third possible implementation manners of the third aspect, in a fourth possible implementation manner of the third aspect, the connection-oriented protocol includes TCP or SCTP.

According to a fourth aspect, an embodiment of the present application provides a network performance monitoring apparatus that includes: a receiving module, configured to receive, within a preset time, a second packet sent by a first network device, where the second packet is a duplicate packet of a first packet, the second packet is copied when the first network device sends the first packet to a second network device, a destination receive end of the first packet is the second network device, and a type of the first packet is a packet of a traffic flow transmitted by using a connection-oriented protocol; a statistics module, configured to collect statistics about a quantity of the second packets received by the receiving module within the preset time to obtain a first count; where the statistics module is further configured to collect statistics about a quantity of retransmitted packets in the second packets received by the receiving module within the preset time to obtain a second count; and a determining module, configured to determine a packet loss rate from the first network device to the second network device according to the first count and the second count that are obtained by the statistics module.

In a first possible implementation manner of the fourth aspect, the network performance monitoring apparatus further includes a first counter and a second counter, where a value of the first counter is the first count, a value of the second counter is the second count, and initial values of the first counter and the second counter are respectively set to zero; and a storage module, configured to store a correspondence between a sequence number and a traffic flow identifier that are carried by the second packet; wherein the statistics module is specifically configured to, when the receiving module receives the second packet, increase the value of the first counter by 1, and search, according to the sequence number and the traffic flow identifier that are carried by the second packet, information stored by the storage module to determine whether a matching item exists, where the stored information includes a correspondence between a sequence number and a traffic flow identifier; if the matching item exists, determine that the second packet is the retransmitted packet, and increase the value of the second counter by 1; if the matching item does not exist, trigger the storage module to save the correspondence between the sequence number and the traffic flow identifier that are carried by the second packet.

With reference to the fourth aspect or the first possible implementation manner of the fourth aspect, in a second possible implementation manner of the fourth aspect, the network performance monitoring apparatus is disposed outside the first network device; and the receiving module is specifically configured to receive the second packet obtained by the first network device by copying the first packet in a mirroring manner.

With reference to the fourth aspect or the first possible implementation manner of the fourth aspect, in a third possible implementation manner of the fourth aspect, the first network device is an optical splitter.

With reference to the fourth aspect or any one of the first to the third possible implementation manners of the fourth aspect, in a fourth possible implementation manner of the fourth aspect, the connection-oriented protocol includes TCP or SCTP.

In the foregoing technical solutions, a network performance monitoring apparatus collects, within a preset time, statistics about a quantity of second packets sent by a first network device and a quantity of retransmitted packets in the second packets, to determine a packet loss rate from the first network device to a second network device. The second packet is copied when the first network device sends a first packet to the second network device, the first packet is a packet of a traffic flow transmitted by using a connection-oriented protocol, and a destination receive end of the first packet is the second network device. The first packet is a packet of a traffic flow that actually exists in a network, instead of a packet of a test flow that is extra added to the network. Therefore, when network performance is measured, the solutions provided in the embodiments may reduce network load.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

In technical solutions provided in embodiments of the present application, a round-trip delay and a packet loss rate of a network are determined by using a response mechanism and a retransmission mechanism that a connection-oriented protocol has. The connection-oriented protocol has the response mechanism and the retransmission mechanism, and is a reliable transmission protocol. In the embodiments of the present application, when network performance is measured, no extra test flow is introduced into the network, and therefore, load on the network may be reduced. The technical solutions provided in the embodiments of the present application are applicable to performance measurement of a network, such as an IP network, an IP radio access network (RAN), or a mobile bearer network. For example, in a mobile bearer network, packets on a signaling plane or a management plane are monitored, and these packets are packets transmitted by using a connection-oriented protocol.

Signaling services are transmitted based on SCTP (Stream Control Transmission Protocol), and operation, administration and maintenance (OAM) services are transmitted based on TCP, where both the SCTP protocol and the TCP protocol are connection-oriented protocols.

Figure 1A:
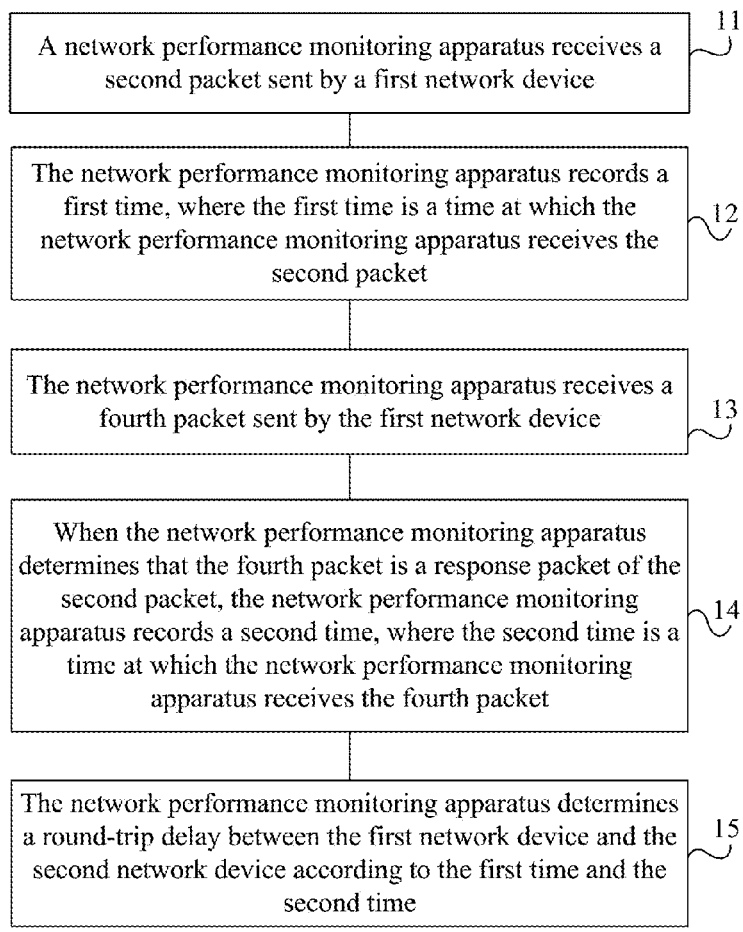
FIG. 1A is a flowchart of a network performance monitoring method according to an embodiment of the present application.

FIG. 1A is a flowchart of a network performance monitoring method according to an embodiment of the present application. As shown in FIG. 1A, the method provided in this embodiment includes:

11. A network performance monitoring apparatus receives a second packet sent by a first network device, where the second packet is a duplicate packet of a first packet, the second packet is copied when the first network device sends the first packet to a second network device, a destination receive end of the first packet is the second network device, a type of the first packet is a packet of a traffic flow transmitted by using a connection-oriented protocol or a packet that is used to establish a connection, and the connection is used to transmit a traffic flow by using a connection-oriented protocol.

12. The network performance monitoring apparatus records a first time, where the first time is a time at which the network performance monitoring apparatus receives the second packet.

For example, the connection-oriented protocol includes TCP or SCTP. In an example in which the connection-oriented protocol is TCP, a packet of a traffic flow transmitted by using the connection-oriented protocol refers to a packet of a TCP traffic flow transmitted after TCP connection establishment is completed, and a packet that is used to establish a connection refers to a control packet during a TCP connection establishment phase.

The second network device is the destination receive end of the first packet, and the first network device may be a source transmit end, or may not be the source transmit end of the first packet, that is, the first network device is an intermediate device that is located between the source transmit end of the first packet and the second network device. The network performance monitoring apparatus is disposed inside or outside the first network device. The foregoing first network device and the second network device may be adjacent devices or non-adjacent devices that meet the foregoing conditions.

When being disposed inside the first network device, the network performance monitoring apparatus may be a card that is inserted into the first network device. When being disposed outside the first network device, the network performance monitoring apparatus may be an external probe that is connected to the first network device.

When the first network device sends the first packet to the second network device, a duplicate packet of the first packet, that is, the second packet, is sent to the network performance monitoring apparatus. After receiving the second packet, the network performance monitoring apparatus records the time at which the second packet is received, that is, the first time. Optionally, in an example in which the second packet is a TCP packet, a sequence number (sequence number) and a traffic flow identifier that are carried by the second packet may further be recorded together with the time at which the second packet is received, so as to determine whether a packet received subsequently is a response packet of the second packet.

Figure 1B:
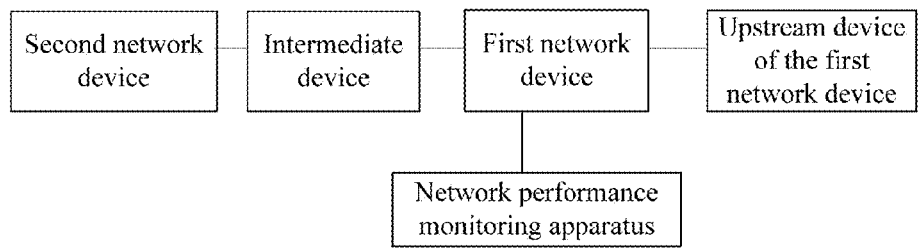
FIG. 1B is a schematic diagram of a network that executes the method shown in FIG. 1A.

For example, as shown in FIG. 1B, the network performance monitoring apparatus is disposed outside the first network device, the first network device copies, in a mirroring manner, a packet sent to the second network device and sends the packet to the network performance monitoring apparatus, and the network performance monitoring apparatus receives the second packet obtained by the first network device by copying the first packet in the mirroring manner. For example, the mirroring manner includes a port mirroring manner and a traffic mirroring manner.

When the port mirroring manner is used, the first network device is connected to the network performance monitoring apparatus through a mirroring port, and the mirroring port copies, to the mirroring port, all packets transmitted on a mirrored port. For example, a port that is on the first network device and connected to an upstream device of the first network device, or a port that is on the first network device and connected to an intermediate device may be set as the mirrored port. Therefore, when the first network device sends a packet to the second network device, the first network device copies the sent packet to the network performance monitoring apparatus by means of mirroring. The packet that is sent by the first network device to the second network device includes the first packet. When receiving the packet sent by the first network device, the network performance monitoring apparatus analyzes the packet sent by the first network device to determine whether the packet is the second packet. For example, the network performance monitoring apparatus may determine whether a protocol used by the packet is a connection-oriented protocol by analyzing a protocol field in the received packet; and determine whether a destination receive end of the packet is the second network device according to a destination IP address in the packet. If the network performance monitoring apparatus determines that the packet sent by the first network device is the second packet, a time at which the second packet is received is recorded.

When the traffic mirroring manner is used, the first network device is connected to the network performance monitoring apparatus through a mirroring port, and the mirroring port copies all packets of a pre-identified traffic flow on the first network device to the mirroring port. For example, a traffic flow may be identified by using a 5-tuple. Therefore, when the first network device sends a packet to the second network device, the first network device may mirror a specific packet, such as the first packet, to the network performance monitoring apparatus. When receiving a duplicate packet of the first packet, that is, the second packet, the network performance monitoring apparatus records a time at which the second packet is received.

Figure 1C:
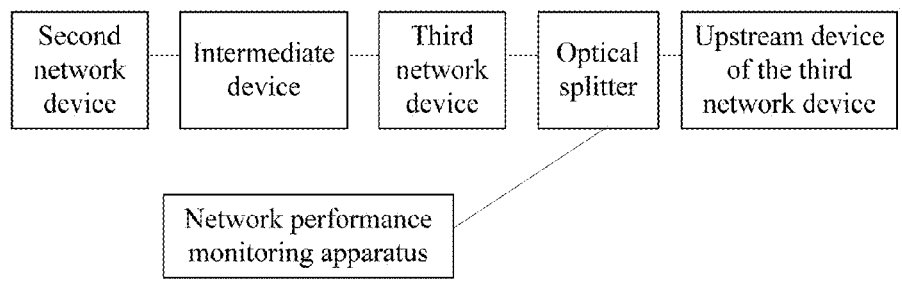
FIG. 1C is a schematic diagram of a network that executes the method shown in FIG. 1A.

For example, as shown in FIG. 1C, an optical splitter is disposed between a third network device and an upstream device of the third network device, the optical splitter is adjacent to the third network device, and the network performance monitoring apparatus is connected to the optical splitter; in this case, the optical splitter may be considered as the first network device. A round-trip delay between the optical splitter and the second network device may be considered as a round-trip delay between the third network device and the second network device. After receiving a packet that is sent by the upstream device of the third network device to the second network device, the optical splitter sends the packet to the second network device, and simultaneously sends a duplicate packet of the packet to the network performance monitoring apparatus. The packet that is sent by the optical splitter to the second network device includes the first packet; similarly, the packet that is sent by the optical splitter to the network performance monitoring apparatus includes a duplicate packet of the first packet, that is, the second packet. After receiving the packet sent by the optical splitter, the network performance monitoring apparatus analyzes whether the packet is the second packet, and if yes, the network performance monitoring apparatus records a time at which the packet is received.

13. The network performance monitoring apparatus receives a fourth packet sent by the first network device, where the fourth packet is a duplicate packet of a third packet, the fourth packet is copied when the first network device receives the third packet sent by the second network device, a type of the third packet is the same as the type of the first packet, and a source transmit end of the third packet is the second network device.

The type of the third packet is the same as the type of the first packet. If the first packet is a packet of a traffic flow transmitted by using a connection-oriented protocol, the third packet is also a packet of a traffic flow transmitted by using a connection-oriented protocol. If the first packet is a packet that is used to establish a connection, and the connection is used to transmit a traffic flow by using a connection-oriented protocol, the third packet is also a packet that is used to establish a connection, and the connection is used to transmit a traffic flow by using a connection-oriented protocol.

For example, as shown in FIG. 1B, in a port mirroring scenario, the first network device copies all received packets (including the third packet) that are sent by the second network device to the upstream device of the first network device to the network performance monitoring apparatus; in a traffic mirroring scenario, the first network device may copy a specific packet, such as the third packet, to the network performance monitoring apparatus.

For example, as shown in FIG. 1C, the optical splitter (that is, the first network device) copies all packets (including the third packet) that are sent by the second network device to the upstream device of the third network device to the network performance monitoring apparatus.

14. When the network performance monitoring apparatus determines that the fourth packet is a response packet of the second packet, the network performance monitoring apparatus records a second time, where the second time is a time at which the network performance monitoring apparatus receives the fourth packet.

For example, the network performance monitoring apparatus may determine whether the fourth packet is the response packet of the second packet by using the following method: An example in which the second packet and the fourth packet are TCP packets is used; optionally, the network performance monitoring apparatus may determine, according to the recorded traffic flow identifier and sequence number that are carried by the second packet, whether a traffic flow identifier carried by the received fourth packet and the traffic flow identifier carried by the second packet belong to a same TCP connection and the fourth packet and the second packet belong to counter flows, and if the traffic flow identifier carried by the received fourth packet and the traffic flow identifier carried by the second packet belong to the same TCP connection and the fourth packet and the second packet belong to counter flows, further determine whether there is a correspondence between an acknowledgement number (acknowledgement number) carried by the fourth packet and the sequence number (sequence number) carried by the second packet. If yes, it is determined that the fourth packet is the response packet of the second packet. For example, if a 5-tuple is used to identify a traffic flow, it is assumed that the recorded traffic flow identifier in the second packet is (source IP address=1.1.1.1, destination IP address=2.2.2.2, source port number=1038, destination port number=8080, and protocol number=TCP), and the recorded sequence number (sequence number) in the second packet=400; the traffic flow identifier in the fourth packet is (source IP address=2.2.2.2, destination IP address=1.1.1.1, source port number=8080, destination port number=1038, and protocol number=TCP), and the acknowledgement number (acknowledgement number) in the fourth packet=401; then, the fourth packet is the response packet of the second packet.

After determining that the fourth packet is the response packet of the second packet, the network performance monitoring apparatus records the time at which the fourth packet is received, that is, the second time.

15. The network performance monitoring apparatus determines a round-trip delay between the first network device and the second network device according to the first time and the second time.

The round-trip delay is also called a round-trip time (RTT) between the first network device and the second network device. If the first network device is an optical splitter, a round-trip delay between the optical splitter and the second network device is determined.

For example, the round-trip delay between the first network device and the second network device=the second time−the first time.

Optionally, the network performance monitoring apparatus may record a receiving time of a second packet received within a preset time and a receiving time of a response packet of the second packet, or may record, after a preset number of second packets are received, a time at which a second packet is received and a time at which a response packet of the second packet is received.

After receiving times of multiple second packets and receiving times of corresponding response packets are recorded by using the foregoing method, the network performance monitoring apparatus may calculate a round-trip delay between the first network device and the second network device for each second packet, and finally, average multiple round-trip delays to obtain an average round-trip delay between the first network device and the second network device.

Figure 2:
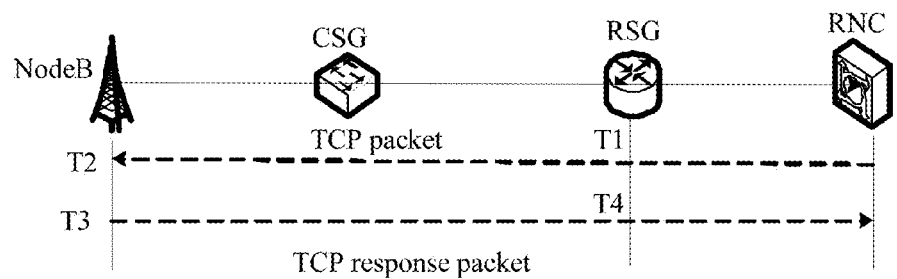
FIG. 2 is a schematic diagram of an application scenario according to an embodiment of the present application.

For ease of understanding, the following gives a description by using an actual network architecture. Based on the network architecture shown in FIG. 2, a radio network controller (RNC) may be used as a source transmit end of a packet of a TCP traffic flow, and correspondingly, a base station (NodeB) is a destination receive end. Similarly, the NodeB may also be used as a source transmit end of a packet of a TCP traffic flow, and correspondingly, the RNC is a destination receive end. All network devices between the NodeB and the RNC are forwarding devices of a packet of a TCP traffic flow.

For example, when the RNC is used as a source transmit end of a packet of a TCP traffic flow and the NodeB is used as a destination receive end of the packet of the TCP traffic flow, if a round-trip delay between a radio service gateway (RSG) and the NodeB needs to be monitored, the network performance monitoring apparatus provided in this embodiment may be disposed inside or outside the RSG.

If a round-trip delay between the RNC and the NodeB needs to be monitored, the network performance monitoring apparatus provided in this embodiment may be disposed inside or outside the RNC, and the network performance monitoring apparatus provided in this embodiment may also be disposed inside or outside the NodeB.

When the NodeB is used as a source transmit end of a packet of a TCP traffic flow and the RNC is used as a destination receive end of the packet of the TCP traffic flow, if a round-trip delay between the RSG and the RNC needs to be monitored, the network performance monitoring apparatus provided in this embodiment may be disposed inside or outside the RSG. The network performance monitoring apparatus provided in this embodiment may be a probe (probe).

Figure 3A:
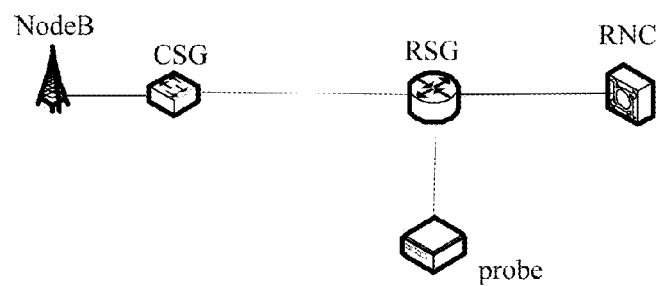
FIG. 3A is a schematic diagram of acquiring a traffic flow by an external network performance monitoring apparatus according to an embodiment of the present application.

When a network performance monitoring apparatus externally connected to an RSG monitors a round-trip delay between the RSG and a NodeB, as shown in FIG. 3A, for example, the RSG may enable a port mirroring function, and the RSG completely copies a transmitted packet to a specified mirroring port, where the mirroring port is connected to the mounted network performance monitoring apparatus (that is, a probe), and the mounted network performance monitoring apparatus receives, through the mirroring port, a packet transmitted by the RSG. In this case, the RSG is the first network device and the NodeB is the second network device. In addition, with reference to FIG. 2 and FIG. 3A, when a packet in a TCP traffic flow sent by the RNC to the NodeB passes the RSG, the RSG copies the packet of the traffic flow to the probe, that is, the network performance monitoring apparatus, and the network performance monitoring apparatus records a time T1 at which the duplicate packet is received; correspondingly, when a response packet that is of the TCP traffic flow and sent by the NodeB to the RNC passes the RSG, the RSG copies the response packet to the network performance monitoring apparatus, and the network performance monitoring apparatus records a time T4 at which a duplicate packet of the response packet is received. The network performance monitoring apparatus determines the round-trip delay between the RSG and the NodeB according to T4 and T1.

Figure 3B:
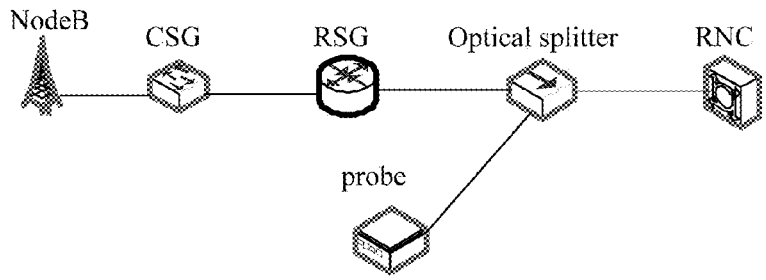
FIG. 3B is a schematic diagram of acquiring a traffic flow by another external network performance monitoring apparatus according to an embodiment of the present application.

As shown in FIG. 3B, when the network performance monitoring apparatus externally connected to the RSG monitors the round-trip delay between the RSG and the NodeB, an optical splitter may be connected in an upstream direction of the RSG, where the optical splitter is separately connected to the network performance monitoring apparatus (that is, the probe) and the RNC, and the optical splitter needs to be adjacent to the RSG. The optical splitter sends, to the RSG and the network performance monitoring apparatus simultaneously, a packet of a downlink TCP traffic flow that is from the RNC, and may further send, to the network performance monitoring apparatus and the RNC at the same time, a packet of an uplink TCP traffic flow sent by the RSG. In addition, with reference to FIG. 2 and FIG. 3B, when receiving from the optical splitter a duplicate packet of a packet of a TCP traffic flow that is sent by the RNC to the NodeB, the network performance monitoring apparatus records a time T1 at which the duplicate packet is received. It may be considered by default that, the RSG also receives the packet of the TCP traffic flow at the time T1, and the RSG forwards the packet of the TCP traffic flow to the NodeB at the time T1. The NodeB receives the packet of the TCP traffic flow forwarded by a CSG (Cell Site Gateway) at a time T2; after receiving the foregoing packet of the TCP traffic flow, the NodeB sends a response packet of the packet of the TCP traffic flow to the RNC at a time T3. The network performance monitoring apparatus records a time T4 at which a duplicate packet of the response packet of the packet of the TCP traffic flow is received from the optical splitter, and T4 may be used as a time at which the RSG receives the response packet of the packet of the TCP traffic flow. The network performance monitoring apparatus determines the round-trip delay between the RSG and the NodeB according to T4 and T1.

For example, when the network performance monitoring apparatus mounted on the exterior of the RSG monitors the round-trip delay between the RSG and the NodeB, an optical splitter may also be connected in a downstream direction of the RSG, where the optical splitter is further separately connected to the network performance monitoring apparatus and the CSG, and the optical splitter is adjacent to the RSG.

In the foregoing technical solution, a network performance monitoring apparatus disposed inside or outside a first network device records a first time when receiving a second packet sent by the first network device, records a second time when determining that a response packet of the second packet sent by the first network device is received, and determines a round-trip delay between the first network device and a second network device according to the first time and the second time. The second packet is copied when the first network device sends a first packet to the second network device, a type of the first packet is a packet of a traffic flow transmitted by using a connection-oriented protocol or a packet that is used to establish a connection, where the connection is used to transmit a traffic flow by using a connection-oriented protocol, and a destination receive end of the first packet is the second network device. The first packet and a third packet are packets of traffic flows or packets that are used to establish a connection that actually exist in a network, instead of packets of test flows that are extra added to the network. Therefore, when network performance is measured, the solution provided in this embodiment may reduce network load.

In addition, in a solution of active measurement in the prior art, performance of an actual traffic flow in a network is estimated by using a test packet, and a path of the test packet may be inconsistent with a path of the actual traffic flow; therefore, measurement accuracy is relatively low. In this embodiment of the present application, however, because the first packet and the third packet are packets of traffic flows or packets that are used to establish a connection that actually exist in a network, accuracy of network performance measurement may be improved.

Furthermore, in the solution of active measurement in the prior art, when network performance between two network devices is measured, in order to reduce burden of the two network devices in processing a test flow, a probe is generally mounted on each network device, and the test flow is sent between the two probes. In this embodiment of the present application, however, a probe does not need to be disposed on a second network device side, and therefore a quantity of probes to be deployed may be reduced.

Figure 4:
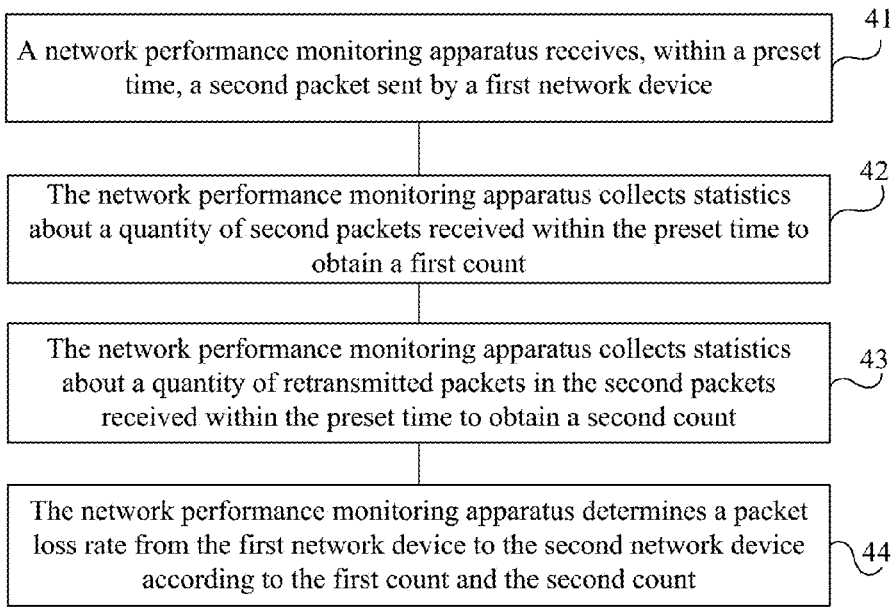
FIG. 4 is a flowchart of a network performance monitoring method according to an embodiment of the present application.

FIG. 4 is a flowchart of a network performance monitoring method according to an embodiment of the present application. This embodiment is used to monitor a packet loss rate from a first network device to a second network device in a network. An execution body of this embodiment, that is, a network performance monitoring apparatus, may be disposed inside the first network device, and may also be disposed outside the first network device. As shown in FIG. 4, the method provided in this embodiment includes:

41. The network performance monitoring apparatus receives, within a preset time, a second packet sent by the first network device, where the second packet is a duplicate packet of a first packet, the second packet is copied when the first network device sends the first packet to the second network device, a destination receive end of the first packet is the second network device, and a type of the first packet is a packet of a traffic flow transmitted by using a connection-oriented protocol.

42. The network performance monitoring apparatus collects statistics about a quantity of second packets received within the preset time to obtain a first count.

For example, the connection-oriented protocol includes TCP or SCTP. In an example in which the connection-oriented protocol is TCP, a packet of a traffic flow transmitted by using the connection-oriented protocol refers to a packet of a TCP traffic flow transmitted after TCP connection establishment is completed.

The second network device is the destination receive end of the first packet, and the first network device may be a source transmit end of the first packet, or may not be the source transmit end, that is, the first network device is an intermediate device that is located between the source transmit end of the first packet and the second network device. The network performance monitoring apparatus is disposed inside or outside the first network device. The foregoing first network device and the second network device may be adjacent devices or non-adjacent devices that meet the foregoing conditions.

When being disposed inside the first network device, the network performance monitoring apparatus may be a card that is inserted into the first network device. When being disposed outside the first network device, the network performance monitoring apparatus may be an external probe that is connected to the first network device.

When the first network device sends the first packet to the second network device, a duplicate packet of the first packet, that is, the second packet, is sent to the network performance monitoring apparatus.

The same as the embodiment corresponding to FIG. 1A, when the network performance monitoring apparatus is disposed outside the first network device, for example, referring to FIG. 1B, the first network device may copy the sent first packet to the network performance monitoring apparatus in a mirroring manner, and the network performance monitoring apparatus receives the second packet obtained by the first network device by copying the first packet in the mirroring manner. The mirroring manner includes a port mirroring manner and a traffic mirroring manner. For another example, referring to FIG. 1C, an optical splitter may be disposed between a third network device and an upstream device of the third network device, the optical splitter is adjacent to the third network device, and the network performance monitoring apparatus is connected to the optical splitter; in this case, the optical splitter may be considered as the first network device. Certainly, the optical splitter may also be disposed between the third network device and an intermediate device, and the optical splitter is adjacent to the third network device. For a specific technical solution about how a network performance monitoring apparatus receives a duplicate packet in a mirroring manner or an optical splitter manner and determines whether the received duplicate packet is the second packet, refer to descriptions of embodiments corresponding to FIG. 1B, FIG. 1C, FIG. 3A, and FIG. 3B, and details are not described herein again.

43. The network performance monitoring apparatus collects statistics about a quantity of retransmitted packets in the second packets received within the preset time to obtain a second count.

A packet of a TCP traffic flow is used as an example; in a traditional manner, after a sender sends a packet of a TCP traffic flow, a TCP timer is started, and if an acknowledgement message of the packet of the TCP traffic flow is still not received after the TCP timer expires, the packet of the TCP traffic flow is retransmitted. For fast retransmission, when the sender consecutively receives three repeated acknowledgement (ACK) packets, it is determined that a packet of a traffic flow is lost, and the lost packet of the TCP traffic flow is fast retransmitted. Therefore, the second packet received by the network performance monitoring apparatus includes a packet that is copied when the first network device sends a packet of a TCP traffic flow to the second network device for the first time, and further includes a packet that is copied when the first network device retransmits the packet of the TCP traffic flow to the second network device. In order to determine a packet loss rate within the preset time, the network performance monitoring apparatus needs to determine whether a second packet received within the preset time is a packet of a TCP traffic flow that is sent for the first time, or a retransmitted packet of the TCP traffic flow, and collect statistics about a quantity of retransmitted packets in the received second packets to obtain the second count.

For example, a method of collecting statistics about the first count and the second count by the network performance monitoring apparatus may be as follows:

The network performance monitoring apparatus sets a first counter and a second counter, where a value of the first counter is the first count, a value of the second counter is the second count, and initial values of the first counter and the second counter are respectively set to zero;

when the network performance monitoring apparatus receives the second packet, the value of the first counter is increased by 1, and information stored by the network performance monitoring apparatus is searched according to a sequence number and a traffic flow identifier that are carried by the second packet to determine whether a matching item exists, where the stored information includes a correspondence between a sequence number and a traffic flow identifier;

if the matching item exists, the network performance monitoring apparatus determines that the second packet is a retransmitted packet, and the value of the second counter is increased by 1; and if the matching item does not exist, the network performance monitoring apparatus saves a correspondence between the sequence number and the traffic flow identifier that are carried by the second packet.

For ease of understanding, for example, in the network performance monitoring apparatus, there is a database that stores the correspondence between a sequence number and a traffic flow identifier, and the database is empty during initialization. When receiving the 1st second packet, the network performance monitoring apparatus reads that a traffic flow identifier in the 1st second packet is (source IP address=1.1.1.1, destination IP address=2.2.2.2, source port number=1038, destination port number=8080, and protocol number=TCP), and a sequence number (sequence number) in the 1st second packet=400, and searches the database for a matching item that is corresponding to the traffic flow identifier and the sequence number. Because the database is empty during initialization, no matching item is found, and the network performance monitoring apparatus saves the traffic flow identifier and the sequence number into the database; when the network performance monitoring apparatus receives the 2nd second packet, if a traffic flow identifier of the 2nd second packet is (source IP address=1.1.1.1, destination IP address=2.2.2.2, source port number=1038, destination port number=8080, and protocol number=TCP), and a sequence number (sequence number) in the 2nd second packet=400, the network performance monitoring apparatus finds a matching item in the database by using the traffic flow identifier and the sequence number in the 2nd second packet, and therefore, it is determined that the 2nd second packet is the retransmitted packet.

44. The network performance monitoring apparatus determines a packet loss rate from the first network device to the second network device according to the first count and the second count.

For example, it is assumed that within the preset time, the value of the first count is 100, and the value of the second count is 30; then, it is determined that the packet loss rate from the first network device to the second network device=30/100=30%.

In the foregoing technical solution, a network performance monitoring apparatus collects, within a preset time, statistics about a quantity of second packets sent by a first network device and a quantity of retransmitted packets in the second packets, to determine a packet loss rate from the first network device to a second network device. The second packet is copied when the first network device sends a first packet to a second network, the first packet is a packet of a traffic flow transmitted by using a connection-oriented protocol, and a destination receive end of the first packet is the second network device. The first packet and a third packet are packets of traffic flows that actually exist in a network or packets that are used to establish a connection, instead of packets of test flows that are extra added to the network. Therefore, when network performance is measured, the solution provided in this embodiment may reduce network load.

In addition, in a solution of active measurement in the prior art, performance of an actual traffic flow in a network is estimated by using a test packet, and a path of the test packet may be inconsistent with a path of the actual traffic flow; therefore, measurement accuracy is relatively low. In this embodiment of the present application, however, because the first packet and the third packet are packets of traffic flows that actually exist in a network or packets that are used to establish a connection, accuracy of network performance measurement may be improved.

Furthermore, in the solution of active measurement in the prior art, when performance of a network between two network devices is measured, in order to reduce burden of the two network devices in processing a test flow, a probe is generally mounted on the two network devices separately, and the test flow is sent between the two probes. In this embodiment of the present application, however, a probe does not need to be disposed on a second network device side, and therefore a quantity of probes to be deployed may be reduced.

Figure 5:
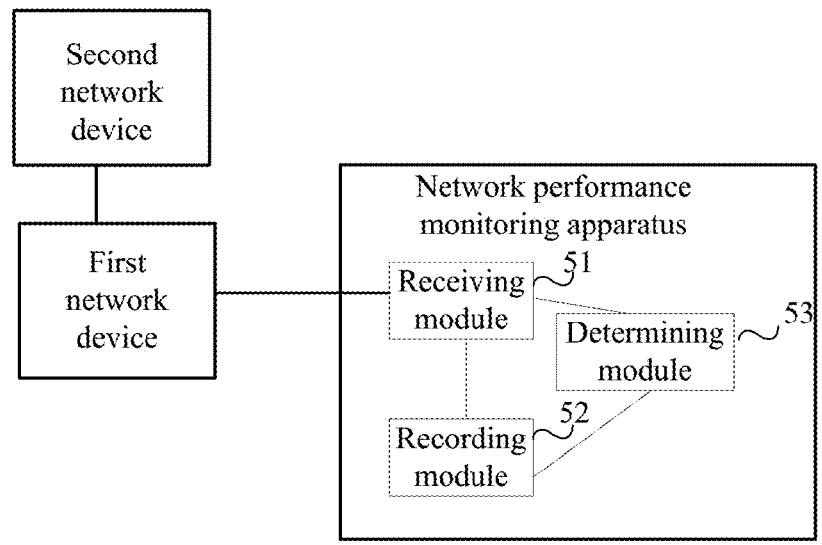
FIG. 5 is a schematic structural diagram of a network performance monitoring apparatus according to an embodiment of the present application.

FIG. 5 is a schematic structural diagram of a network performance monitoring apparatus according to an embodiment of the present application. The apparatus provided in this embodiment is configured to monitor a round-trip delay between a first network device and a second network device, and the apparatus provided in this embodiment is disposed inside or outside the first network device. FIG. 5 shows a case in which the apparatus is disposed outside the first network device. The first network device may be adjacent to the second network device, or may not be adjacent to the second network device.

As shown in FIG. 5, the apparatus provided in this embodiment includes: a receiving module 51, a recording module 52, and a determining module 53; where:

the receiving module 51 is configured to receive a second packet sent by the first network device, where the second packet is a duplicate packet of a first packet, the second packet is copied when the first network device sends the first packet to the second network device, a destination receive end of the first packet is the second network device, a type of the first packet is a packet of a traffic flow transmitted by using a connection-oriented protocol or a packet that is used to establish a connection, and the connection is used to transmit a traffic flow by using a connection-oriented protocol;

the recording module 52 is configured to record a first time, where the first time is a time at which the receiving module 51 receives the second packet;

the receiving module 51 is further configured to receive a fourth packet sent by the first network device, where the fourth packet is a duplicate packet of a third packet, the fourth packet is copied when the first network device receives the third packet sent by the second network device, a type of the third packet is the same as the type of the first packet, and a source transmit end of the third packet is the second network device;

the determining module 53 is configured to determine whether the fourth packet is a response packet of the second packet;

the recording module 52 is further configured to record a second time when the determining module 53 determines that the fourth packet is the response packet of the second packet, where the second time is a time at which the receiving module 51 receives the fourth packet; and the determining module 53 is further configured to determine the round-trip delay between the first network device and the second network device according to the first time and the second time that are recorded by the recording module 52.

Optionally, the network performance monitoring apparatus is disposed outside the first network device; the receiving module 51 is specifically configured to receive the second packet obtained by the first network device by copying the first packet in a mirroring manner; and the receiving module 51 is further specifically configured to receive the fourth packet obtained by the first network device by copying the third packet in the mirroring manner.

Optionally, the first network device is an optical splitter.

Optionally, the connection-oriented protocol includes TCP or SCTP.

The network performance monitoring apparatus in this embodiment of the present application may execute the method executed by the network performance monitoring apparatus in the embodiment shown in FIG. 1A to achieve a same beneficial effect, and details are not described herein again.

Figure 6:
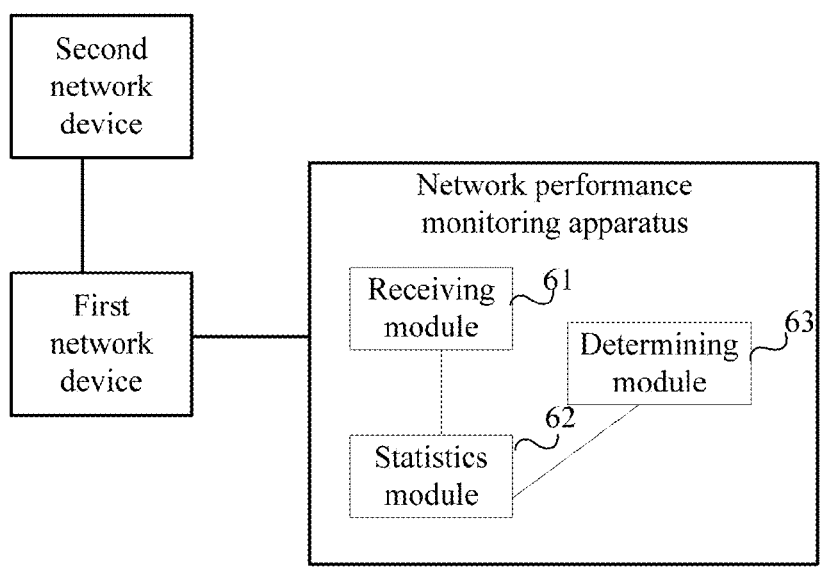
FIG. 6 is a schematic structural diagram of another network performance monitoring apparatus according to an embodiment of the present application.

FIG. 6 is a schematic structural diagram of another network performance monitoring apparatus according to an embodiment of the present application. The apparatus provided in this embodiment is configured to monitor a packet loss rate from a first network device to a second network device, and the apparatus provided in this embodiment is disposed inside or outside the first network device. FIG. 6 shows a case in which the apparatus is disposed outside the first network device. The first network device may be adjacent to the second network device, or may not be adjacent to the second network device.

As shown in FIG. 6, the apparatus provided in this embodiment includes: a receiving module 61, a statistics module 62, and a determining module 63;

where:

the receiving module 61 is configured to receive, within a preset time, a second packet sent by the first network device, where the second packet is a duplicate packet of a first packet, the second packet is copied when the first network device sends the first packet to the second network device, a destination receive end of the first packet is the second network device, and a type of the first packet is a packet of a traffic flow transmitted by using a connection-oriented protocol;

the statistics module 62 is configured to collect statistics about a quantity of second packets received by the receiving module 61 within the preset time to obtain a first count;

the statistics module 62 is further configured to collect statistics about a quantity of retransmitted packets in the second packets received by the receiving module 61 within the preset time to obtain a second count; and the determining module 63 is configured to determine the packet loss rate from the first network device to the second network device according to the first count and the second count that are counted by the statistics module 62.

Figure 7:
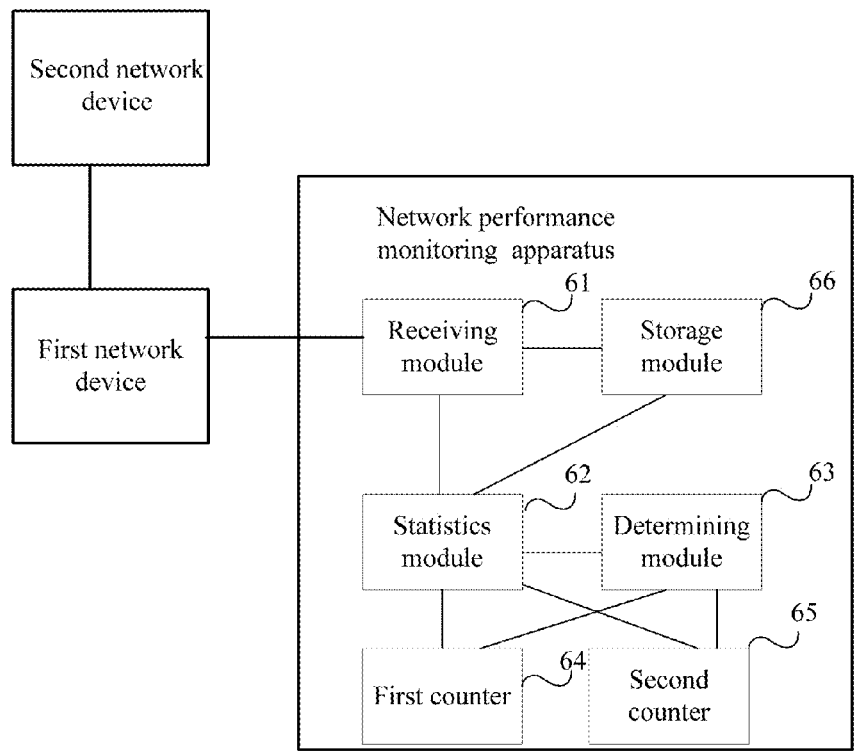
FIG. 7 is a schematic structural diagram of another network performance monitoring apparatus according to an embodiment of the present application.

Optionally, on the basis of what shown in FIG. 6, as shown in FIG. 7, the network performance monitoring apparatus may further include: a first counter 64, a second counter 65, and a storage module 66.

A value of the first counter 64 is the first count, a value of the second counter 65 is the second count, and initial values of the first counter 64 and the second counter 65 are respectively set to zero.

The storage module 66 is configured to save a correspondence between a sequence number and a traffic flow identifier that are carried by the second packet.

Correspondingly, the statistics module 62 is specifically configured to, when the receiving module 61 receives the second packet, increase the value of the first counter 64 by 1, and search, according to the sequence number and the traffic flow identifier that are carried by the second packet, information saved by the storage module 66 to determine whether a matching item exists, where the saved information includes a correspondence between a sequence number and a traffic flow identifier; if the matching item exists, determine that the second packet is the retransmitted packet, and increase the value of the second counter 65 by 1; if the matching item does not exist, trigger the storage module 66 to save the correspondence between the sequence number and the traffic flow identifier that are carried by the second packet.

Optionally, the network performance monitoring apparatus is disposed outside the first network device; and the receiving module 61 is specifically configured to receive the second packet obtained by the first network device by copying the first packet in a mirroring manner.

Optionally, the first network device is an optical splitter.

Optionally, the connection-oriented protocol includes TCP or SCTP.

The network performance monitoring apparatus in this embodiment of the present application may execute the method executed by the network performance monitoring apparatus in the embodiment shown in FIG. 4 to achieve a same beneficial effect, and details are not described herein again.

Figure 8:
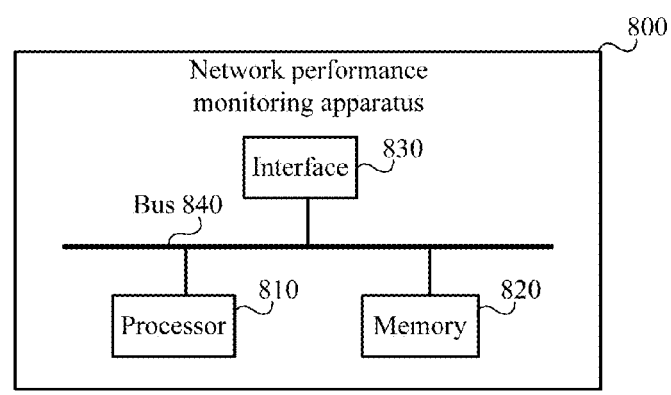
FIG. 8 is a schematic structural diagram of another network performance monitoring apparatus according to an embodiment of the present application.

FIG. 8 is a schematic structural diagram of a network performance monitoring apparatus according to an embodiment of the present application. The apparatus 800 includes: a bus 840; and a processor 810, a memory 820, and an interface 830 that are connected to the bus 840.

The interface 830 is configured to receive a second packet sent by a first network device, where the second packet is a duplicate packet of a first packet, the second packet is copied when the first network device sends the first packet to a second network device, a destination receive end of the first packet is the second network device, a type of the first packet is a packet of a traffic flow transmitted by using a connection-oriented protocol or a packet that is used to establish a connection, and the connection is used to transmit a traffic flow by using a connection-oriented protocol; and the interface 830 is further configured to receive a fourth packet sent by the first network device, where the fourth packet is a duplicate packet of a third packet, the fourth packet is copied when the first network device receives the third packet sent by the second network device, a type of the third packet is the same as the type of the first packet, and a source transmit end of the third packet is the second network device.

The memory 820 is configured to store an instruction, and the processor 810 is configured to execute the instruction, where the instruction is used to record a first time, and the first time is a time at which the interface 830 receives the second packet; executing the instruction by the processor 810 is further used to record a second time when it is determined that the fourth packet is a response packet of the second packet, where the second time is a time at which the interface 830 receives the fourth packet; and the executing the instruction by the processor 810 is further used to determine a round-trip delay between the first network device and the second network device according to the first time and the second time.

In this embodiment of the present application, optionally, the network performance monitoring apparatus is disposed outside the first network device; the interface 830 receives the second packet obtained by the first network device by copying the first packet in a mirroring manner; and the interface 830 receives the fourth packet obtained by the first network device by copying the third packet in the mirroring manner.

In this embodiment of the present application, optionally, the first network device is an optical splitter.

In this embodiment of the present application, optionally, the connection-oriented protocol includes TCP or SCTP.

The network performance monitoring apparatus in this embodiment of the present application may execute the method executed by the network performance monitoring apparatus in the embodiment shown in FIG. 1A to achieve a same beneficial effect, and details are not described herein again.

Figure 9:
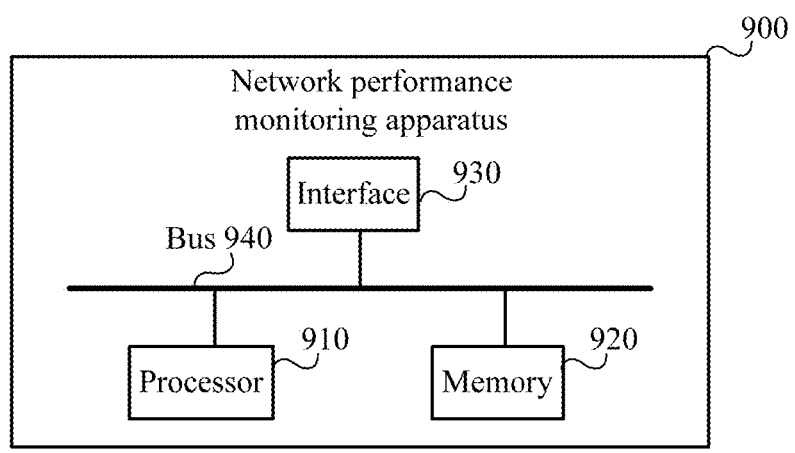
FIG. 9 is a schematic structural diagram of another network performance monitoring apparatus according to an embodiment of the present application.

FIG. 9 is a schematic structural diagram of a network performance monitoring apparatus according to an embodiment of the present application. The apparatus 900 includes: a bus 940; and a processor 910, a memory 920, and an interface 930 that are connected to the bus 940.

The interface 930 is configured to receive, within a preset time, a second packet sent by a first network device, where the second packet is a duplicate packet of a first packet, the second packet is copied when the first network device sends the first packet to a second network device, a destination receive end of the first packet is the second network device, and a type of the first packet is a packet of a traffic flow transmitted by using a connection-oriented protocol.

The memory 920 is configured to store an instruction, and the processor 910 is configured to execute the instruction, where the instruction is used to collect statistics about a quantity of second packets received within the preset time to obtain a first count; collect statistics about a quantity of retransmitted packets in the second packets received within the preset time to obtain a second count; and determine a packet loss rate from the first network device to the second network device according to the first count and the second count.

In this embodiment of the present application, optionally, executing the instruction by the processor 910 to collect statistics about a quantity of second packets received within the preset time to obtain the first count, and collect statistics about a quantity of retransmitted packets in the second packets received within the preset time to obtain the second count includes: setting a first counter and a second counter, where a value of the first counter is the first count, a value of the second counter is the second count, and initial values of the first counter and the second counter are respectively set to zero; when the second packet is received, increasing the value of the first counter by 1, and searching, according to a sequence number and a traffic flow identifier that are carried by the second packet, information saved by the network performance monitoring apparatus to determine whether a matching item exists, where the saved information includes a correspondence between a sequence number and a traffic flow identifier; if the matching item exists, determining that the second packet is the retransmitted packet, and increasing the value of the second counter by 1; if the matching item does not exist, saving a correspondence between the sequence number and the traffic flow identifier that are carried by the second packet.

In this embodiment of the present application, optionally, the network performance monitoring apparatus is disposed outside the first network device, and the interface 930 receives the second packet obtained by the first network device by copying the first packet in a mirroring manner.

In this embodiment of the present application, optionally, the first network device is an optical splitter.

In this embodiment of the present application, optionally, the connection-oriented protocol includes TCP or SCTP.

The network performance monitoring apparatus in this embodiment of the present application may execute the method executed by the network performance monitoring apparatus in the embodiment shown in FIG. 4 to achieve a same beneficial effect, and details are not described herein again.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present application.

What is claimed is:

1. A network performance monitoring method, comprising:
   receiving, by a network performance monitoring apparatus within a preset time, a second packet sent by a first network device, wherein the second packet is a duplicate packet of a first packet, the second packet is copied when the first network device sends the first packet to a second network device, a destination receive end of the first packet is the second network device, and a type of the first packet is a packet of a traffic flow transmitted by using a connection-oriented protocol;
   collecting, by the network performance monitoring apparatus, statistics about a quantity of second packets received within the preset time to obtain a first count;
   collecting, by the network performance monitoring apparatus, statistics about a quantity of retransmitted packets in the second packets received within the preset time to obtain a second count; and
   determining, by the network performance monitoring apparatus, a packet loss rate from the first network device to the second network device according to the first count and the second count, wherein collecting the statistics comprises:
      setting, by the network performance monitoring apparatus, a first counter and a second counter, wherein a value of the first counter is the first count, a value of the second counter is the second count, and initial values of the first counter and the second counter are respectively set to zero;
      when the network performance monitoring apparatus receives a second packet, increasing the value of the first counter by 1, and searching, according to a sequence number and a traffic flow identifier that are carried by the second packet, information stored by the network performance monitoring apparatus to determine whether a matching item exists, wherein the stored information comprises a correspondence between a sequence number and a traffic flow identifier;
      if the matching item exists, determining, by the network performance monitoring apparatus, that the second packet is the retransmitted packet, and increasing the value of the second counter by 1; and
      if the matching item does not exist, saving, by the network performance monitoring apparatus, a correspondence between the sequence number and the traffic flow identifier that are carried by the second packet.

2. The method according to claim 1, wherein if the network performance monitoring apparatus is disposed outside the first network device, receiving, by the network performance monitoring apparatus, the second packet sent by the first network device comprises receiving, by the network performance monitoring apparatus, the second packet obtained by the first network device by copying the first packet in a mirroring manner.

3. The method according to claim 1, wherein the first network device is an optical splitter.

4. The method according to claim 1, wherein the connection-oriented protocol comprises one of: a Transmission Control Protocol (TCP) and a Stream Control Transmission Protocol (SCTP).

5. A network performance monitoring apparatus comprising:
   a processor, a first memory, a second memory, a first counter and a second counter, where the first memory stores instructions, where a value of the first counter is the first count, a value of the second counter is the second count, and initial values of the first counter and the second counter are respectively set to zero,
   wherein, when the processor executes the instructions, the apparatus performs the following:
   receiving, within a preset time, a second packet sent by a first network device, wherein the second packet is a duplicate packet of a first packet, the second packet is copied when the first network device sends the first packet to a second network device, a destination receive end of the first packet is the second network device, and a type of the first packet is a packet of a traffic flow transmitted by using a connection-oriented protocol;

collecting statistics about a quantity of second packets received by the apparatus within the preset time to obtain a first count, collecting statistics about a quantity of retransmitted packets in the second packets received by the apparatus within the preset time to obtain a second count, where the second memory stores a correspondence between a sequence number and a traffic flow identifier that are carried by the second packet;

determining a packet loss rate from the first network device to the second network device according to the first count and the second count; and when the apparatus receives the second packet, increasing the value of the first counter by 1, and searching, according to the sequence number and the traffic flow identifier that are carried by the second packet, information stored in the second memory to determine whether a matching item exists, wherein the stored information comprises a correspondence between a sequence number and a traffic flow identifier, if the matching item exists, determine that the second packet is the retransmitted packet, and increase the value of the second counter by 1, if the matching item does not exist, trigger the second memory to save the correspondence between the sequence number and the traffic flow identifier that are carried by the second packet.

6. The network performance monitoring apparatus according to claim 5, wherein the network performance monitoring apparatus is disposed outside the first network device, and wherein the receiving module is configured to receive the second packet obtained by the first network device by copying the first packet in a mirroring manner.

7. The network performance monitoring apparatus according to claim 5, wherein the first network device is an optical splitter.

8. The network performance monitoring apparatus according to claim 5, wherein the connection-oriented protocol comprises one of: a Transmission Control Protocol (TCP) and a Stream Control Transmission Protocol (SCTP).

9. The network performance monitoring method according to claim 1, where the network performance monitoring apparatus is inside or outside the first network device.

10. The network performance monitoring apparatus according to claim 5, where the network performance monitoring apparatus is inside or outside the first network device.

* * * * *